L. K. YOUNG & C. M. FERGUSON.
Band Saw-Guide.
No. 165,523. Patented July 13, 1875.
Fig: 1.
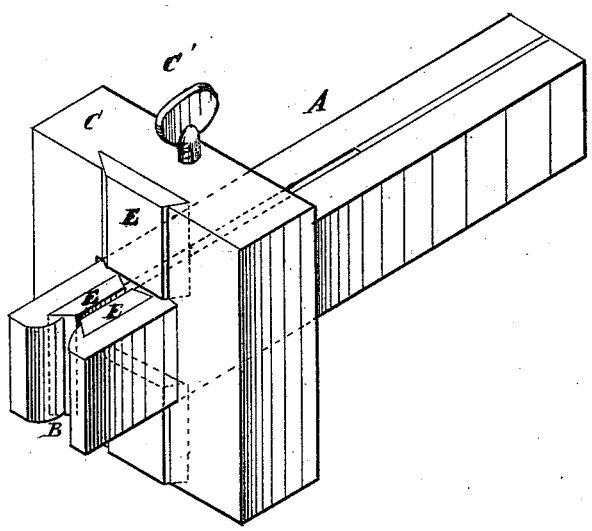
Fig: 2.
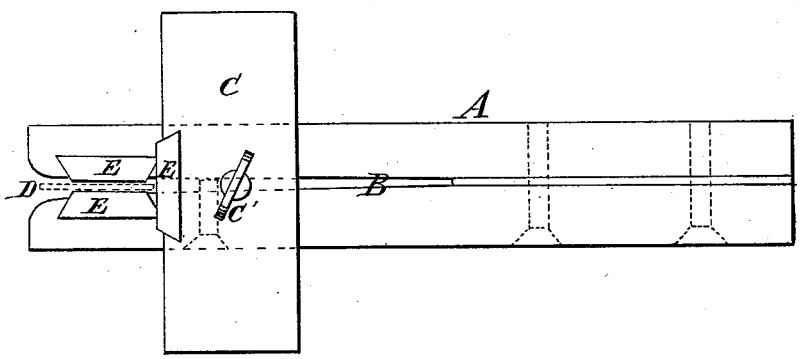

UNITED STATES PATENT OFFICE.

LEWIS K. YOUNG AND CHARLES M. FERGUSON, OF BRIDGEPORT, CONN.

IMPROVEMENT IN BAND-SAW GUIDES.

Specification forming part of Letters Patent No. 165,523, dated July 13, 1875; application filed May 15, 1875.

*To all whom it may concern:*

Be it known that we, LEWIS K. YOUNG and CHARLES M. FERGUSON, of Bridgeport, Fairfield county, Connecticut, have invented a new and useful Improvement in Band-Saw Guides, of which the following is a specification:

The object of this invention is to furnish guides for band saws, which will be durable and hold the saw at the desired point; and it consists in the use of glass dovetailed or set in either wood or metal to form the wearing-surface.

Figure 1 is a perspective view, and Fig. 2 is a top view.

Similar letters of reference indicate corresponding parts.

The guides of band saws are attached to posts or uprights above the saw-table, so as to be no obstruction in turning the work sawed.

A represents a stock, consisting of one or more pieces having a slit, B, from the end in which the saw runs. This stock may be made adjustable in the upright and with a head, C, which is movable on the stock and fastened by the screw C', against which the back edge of the saw runs. D represents a cross-section of the band saw. (Seen in dotted lines in Fig. 2.) E represents the glass guide.

These guides have usually been made of steel or other hard metal, but the friction caused by the rapid motion of the saw heats and soon wears the guide, and allows the saw to wabble, and frequently causes it to break. Other substances than metal have been used, but all are liable to heat and wear.

After trying many experiments with a view of discovering some substance that would stand, we have discovered that glass for the wearing-surfaces is the material sought for.

The glass is cut in pieces of the proper size, and may be dovetailed into the stock, substantially as seen in the drawing, or they may be cemented or fastened in any permanent manner. The back edge of the saw is guided by the glass in the movable head.

These glass guides are readily placed, and they may be ground to any desired shape, so as to be adjusted without loss of time and at slight expense.

Having thus described our invention, we claim as new and desire to secure by Letters Patent—

Glass guides for band saws, substantially as seen at E in the drawing.

LEWIS K. YOUNG.
CHARLES M. FERGUSON.

Witnesses:
CHAS. E. MOORE,
GEORGE C. CARPENTER.